E. R. DEMPSEY.
FEED BAG.
APPLICATION FILED MAR. 25, 1910.
970,021.
Patented Sept. 13, 1910.
2 SHEETS—SHEET 1.
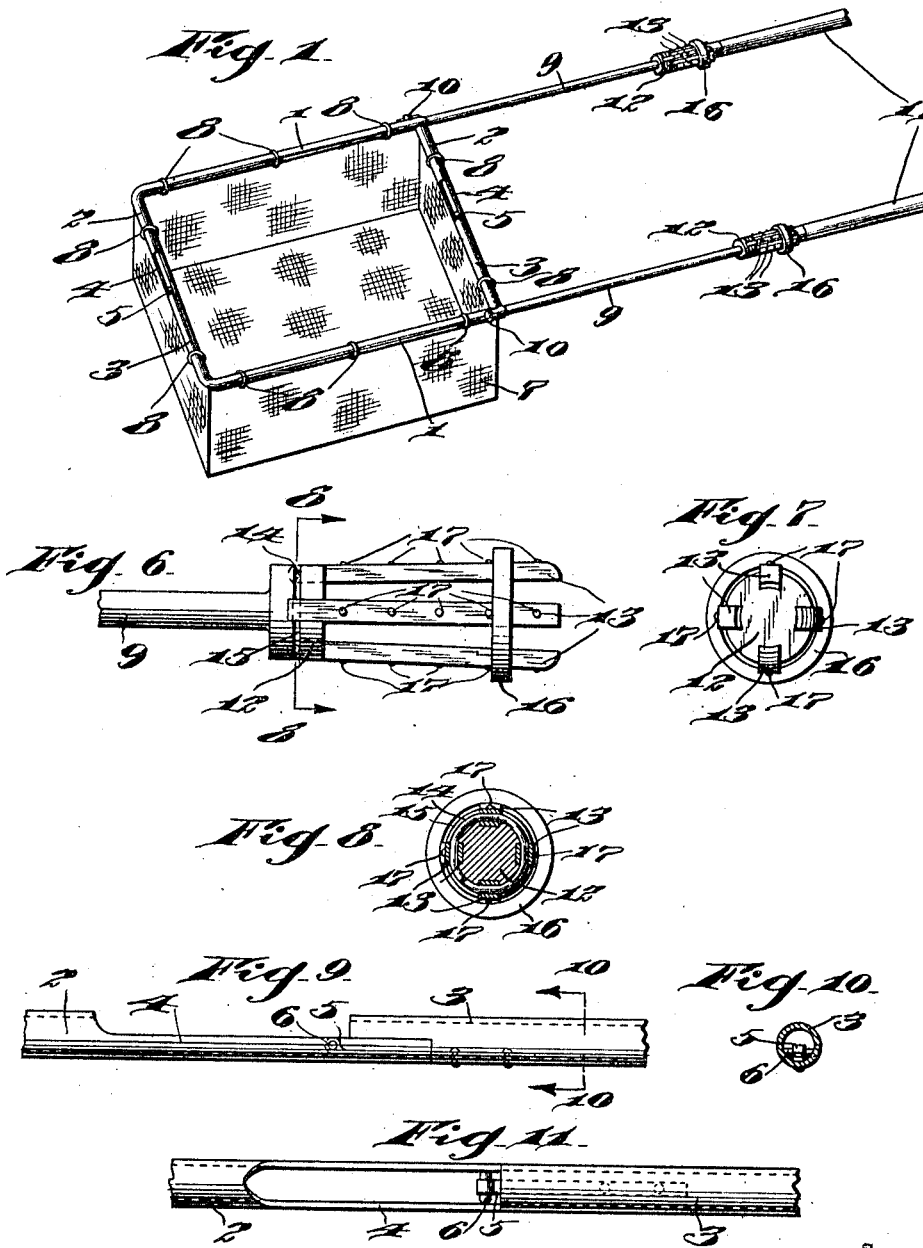

E. R. DEMPSEY.
FEED BAG.
APPLICATION FILED MAR. 25, 1910.
970,021.
Patented Sept. 13, 1910.
2 SHEETS—SHEET 2.
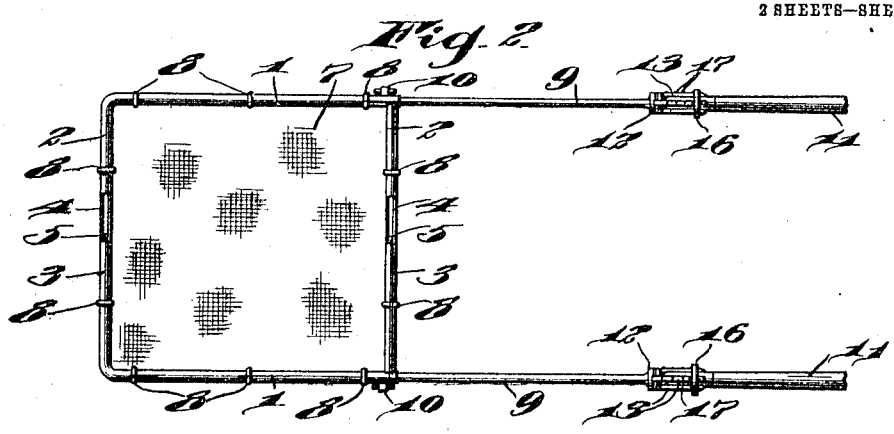
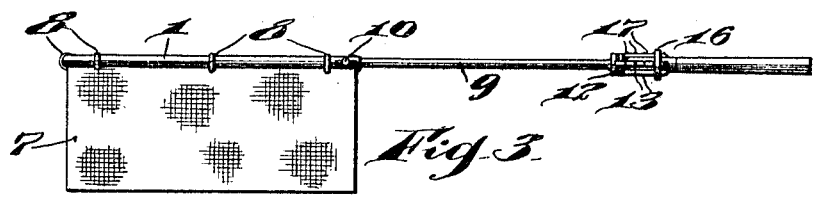
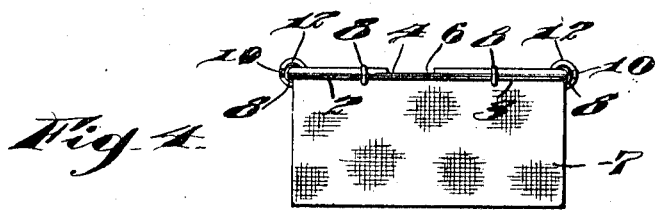
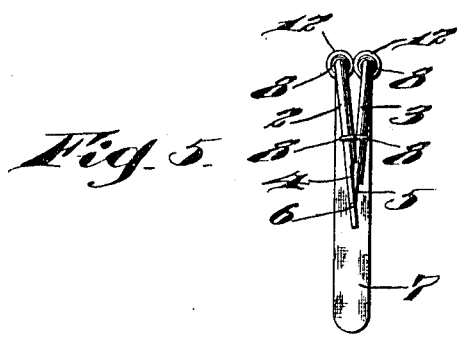
Witnesses
Inventor
Edward R. Dempsey,
By Joshua R. H. Potts
Attorney

UNITED STATES PATENT OFFICE.

EDWARD R. DEMPSEY, OF ATLANTIC CITY, NEW JERSEY.

FEED-BAG.

970,021.

Specification of Letters Patent.  Patented Sept. 13, 1910.

Application filed March 25, 1910.  Serial No. 551,421.

*To all whom it may concern:*

Be it known that I, EDWARD R. DEMPSEY, a citizen of the United States, residing at Atlantic City, in the county of Atlantic and State of New Jersey, have invented certain new and useful Improvements in Feed-Bags, of which the following is a specification.

My invention relates to improvements in feed bags, the object of the invention being to provide an improved feed bag and support, the latter having improved means for attaching it to the shafts of a vehicle, and constructed to be collapsed and folded into small space when not desired for use.

With these and other objects in view, the invention consists in certain novel features of construction and combinations and arrangements. of parts as will be more fully hereinafter described and pointed out in the claims.

In the accompanying drawings: Figure 1, is a perspective view, illustrating my improvements. Fig. 2, is a view in top plan. Fig. 3, is a view in side elevation. Fig. 4, is a view in end elevation. Fig. 5, is a view in end elevation, showing the bag folded. Fig. 6, is an enlarged view in elevation illustrating one of my improved clamps for engaging the end of a shaft. Fig. 7, is an end view of Fig. 6. Fig. 8, is a view in section on the line 8, 8, of Fig. 6. Fig. 9, is an enlarged view in side elevation illustrating the connection between the transverse tubes. Fig. 10, is a view in section on the line 10, 10, of Fig. 9, and Fig. 11, is a top plan view of Fig. 9.

1, 1, represent parallel tubular side members of a rectangular frame, said side members 1, 1, connected by transverse members, each of which consists of two sections 2, and 3, as seen most clearly in Figs. 9, 10, and 11. Section 2, is cut away, as shown at 4, and a tongue 5, on member 3, projects into this cut away portion 4, and is pivotally secured by a pin 6. This form of connection between the sections 2, and 3, enables the sections 2, and 3, to be folded comparatively close together, as shown in Fig. 5, and also limits the pivotal or hinged movement in one direction, so that the sections cannot move above the horizontal.

7, represents the bag proper, which is preferably of canvas or other flexible material, and is provided around its edge with a plurality of rings 8, located on the several members 1, 2, and 3, so as to support the bag on the frame.

Side members 1, as above stated, are tubular in form, and rods 9 telescope in the tubes 1, and 2, and are secured at any adjustment by means of set screws 10. On the free ends of rods 9, my improved clamps are located to engage over the shafts 11. Both of these clamps are alike, and each clamp comprises a notched block 12, at the end of rod 9, and in these blocks 12, longitudinal clamping fingers 13 are pivotally supported by means of a wire 14, which is positioned in an annular groove 15, in block 12, and projects through openings in the fingers 13.

16, represents a ring which is adapted to be moved longitudinally to clamp the fingers 13, around shafts 11, or be moved in the opposite direction to release the shafts.

To prevent accidental release of the shafts, the fingers 13, are provided at suitable intervals with lugs or enlargements 17, over which the ring 16 is forced, and which prevent any accidental retrograde movement of the ring, but over which the ring may be forced when it is desired to release the shafts.

When the device is to be positioned in the vehicle out of the way, rods 9 are telescoped in tubes 1, and secured by the set screws 10, and the sections 2, and 3 of the transverse members, are hinged together as shown in Fig. 5, so that the entire device will occupy but very small space.

Various slight changes might be made in the general form and arrangement of parts described without departing from my invention, and hence I do not limit myself to the precise details set forth, but consider myself at liberty to make such changes and alterations, as fairly fall within the spirit and scope of the appended claims.

Having thus described my invention, what I claim as new and desire to secure by Letters Patent is:

1. A device of the character described, comprising telescoping side members, transverse members connecting the side members, and comprising two sections hinged together, said sections of tubular form, a tongue on one section, the other section cut away and underlying the tongue, whereby the upward movement of the hinged sections is limited, substantially as described.

2. A device of the character described, comprising telescoping side members, transverse members connecting the side members, and comprising two sections hinged together, said sections of tubular form, a tongue on one section, the other section cut away and underlying the said tongue, whereby the upward movement of the hinged sections is limited, clamps on the ends of said telescoping side members adapted to secure them to the shafts of a vehicle, a bag, and rings secured to the edges of said bag and positioned on the side members and the transverse members, substantially as described.

In testimony whereof I have signed my name to this specification in the presence of two subscribing witnesses.

EDWARD R. DEMPSEY.

Witnesses:
R. H. KRENKEL,
C. E. POTTS.